Oct. 4, 1949.	M. H. HANSEN	2,483,700
WEIGHT SCALE
Filed June 10, 1944	4 Sheets-Sheet 1
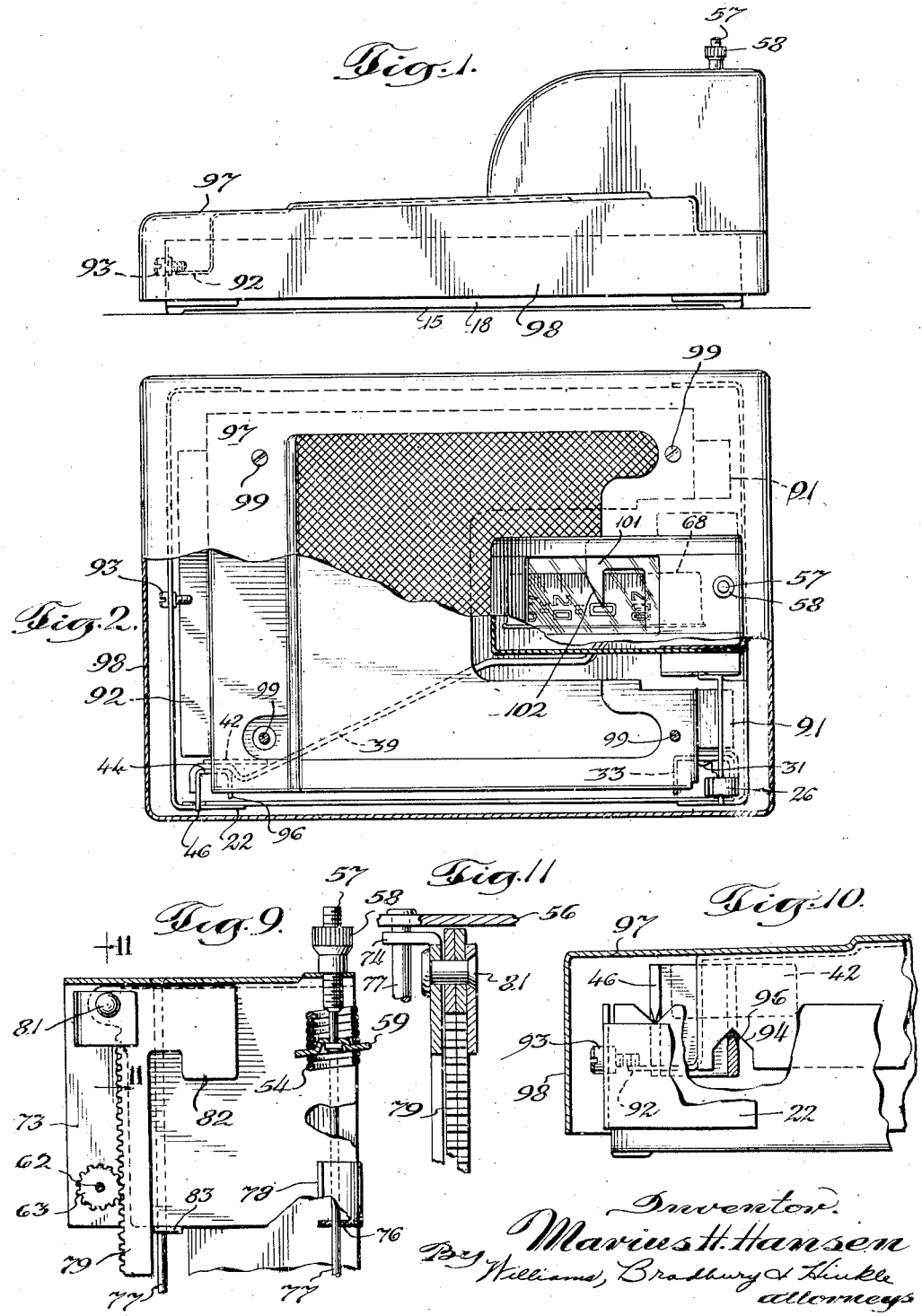
Inventor
Marius H. Hansen
By Williams, Bradbury & Hinkle
Attorneys Oct. 4, 1949.　　　M. H. HANSEN　　　2,483,700
WEIGHT SCALE Filed June 10, 1944　　　　　　　4 Sheets-Sheet 2

Inventor.
Marius H. Hansen
By Williams, Bradbury & Hinkle
attorneys

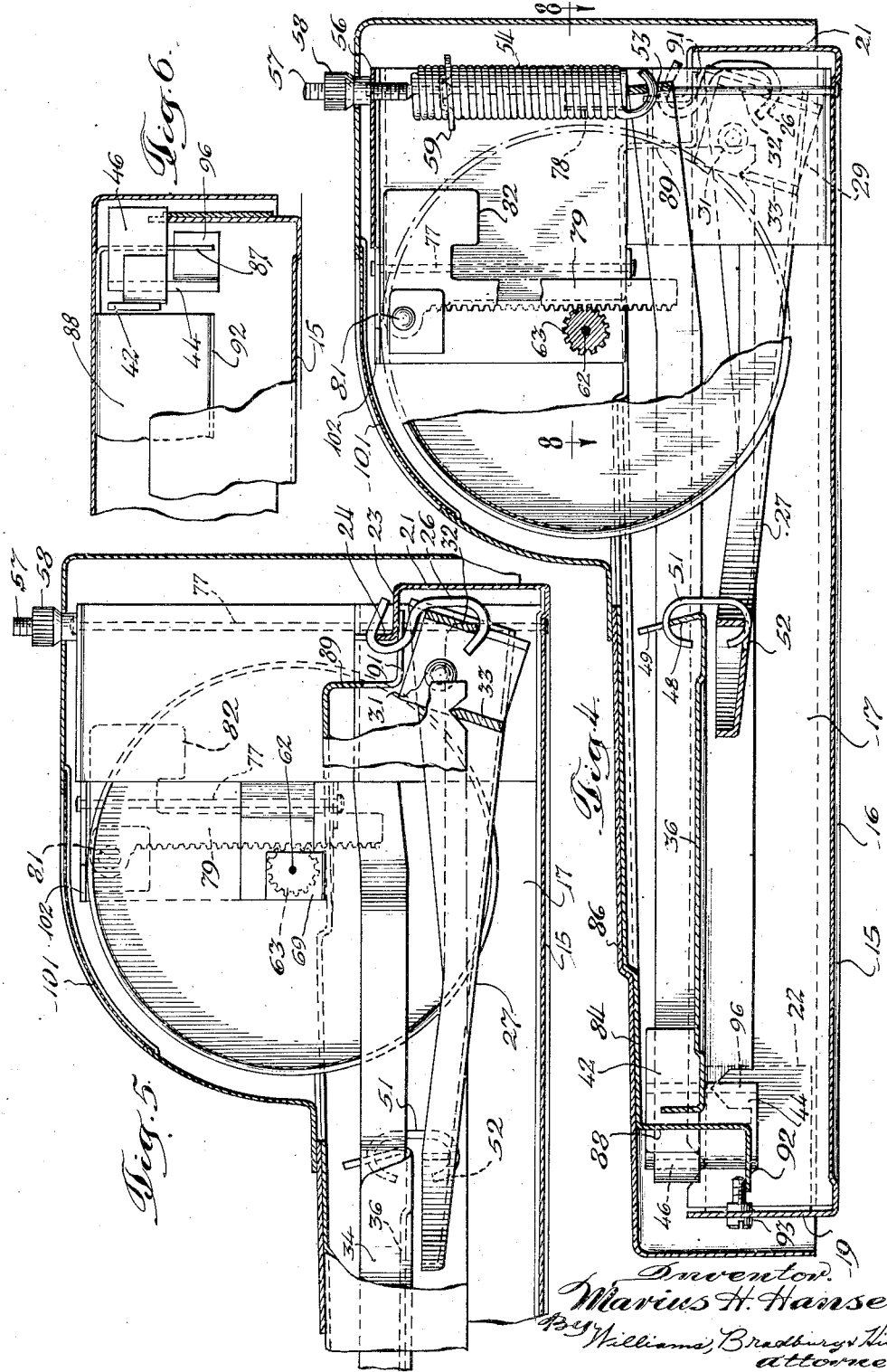

Oct. 4, 1949.   M. H. HANSEN   2,483,700
WEIGHT SCALE

Filed June 10, 1944   4 Sheets-Sheet 4

Inventor
Marius H. Hansen
By Williams, Bradbury & Hinkle
Attorneys

Patented Oct. 4, 1949

2,483,700

UNITED STATES PATENT OFFICE 2,483,700

WEIGHT SCALE

Marius H. Hansen, Chicago, Ill., assignor to Hanson Scale Company, Chicago, Ill., a corporation of Illinois Application June 10, 1944, Serial No. 539,616

3 Claims. (Cl. 265—68)

This invention relates to weighing scales and is more particularly concerned with platform type scales such as are employed in homes, and has for an object the provision of a scale of this type which is simple and inexpensive in construction and reliable in operation.

It is another object of this invention to provide a scale having improved means for actuating a graduated dial. Briefly, this means comprises a pinion secured to the graduated dial and actuated by means of a rack which is pivotally mounted on a vertically movable rack carrier. The rack carrier rests upon the free end of a pivotally mounted weight equalizer lever and moves responsive thereto. Due to the particular construction and arrangement of parts of this dial actuating mechanism, excessive friction or binding of these parts is prevented.

It is a further object of this invention to provide a dial actuating mechanism which may readily be assembled and permits accurate positioning of the several parts for setting the dial with respect to its pointer by merely turning an adjustment nut.

It is a further object of this invention to provide a dial actuating mechanism in which the rack is maintained in operative engagement with its coacting pinion by means of gravity to facilitate assembly and prevent binding.

It is a further object of this invention to provide an improved mounting for the equalizer levers by providing U-shaped pivot plates having oppositely disposed knife edge bearing surfaces formed thereon. The pivot plates are secured to the outer ends of the equalizer levers and have their downwardly facing knife edge bearing surfaces in engagement with V-shaped grooves provided on the base of the scale while their other edges are disposed upwardly for engagement in V-shaped recesses formed in the platform of the scale.

It is a further object of this invention to provide a platform having a raised portion adjacent its central portion in order to bring the weight of a person being weighed towards the center of the platform even though that person may be leaning forward or backward on the platform.

This invention embodies other novel features, details of construction, and arrangement of parts which are hereinafter set forth in the specification and claims and illustrated in the accompanying drawings wherein:

Fig. 1 is a side elevational view of a scale embodying features of this invention;

Fig. 2 is a plan view of Fig. 1 in which part of the scale cover is broken away;

Fig. 4 is a longitudinal sectional view taken along the line 4—4 of Fig. 3;

Fig. 5 is a fragmentary sectional view taken along the line 5—5 of Fig. 3;

Fig. 6 is a fragmentary sectional view taken along the line 6—6 of Fig. 3;

Fig. 9 is a fragmentary sectional view taken along the line 9—9 of Fig. 7;

Fig. 10 is a fragmentary sectional view taken along the line 10—10 of Fig. 3; and Fig. 11 is a fragmentary sectional view taken along the line 11—11 of Fig. 9.

Figure 3:
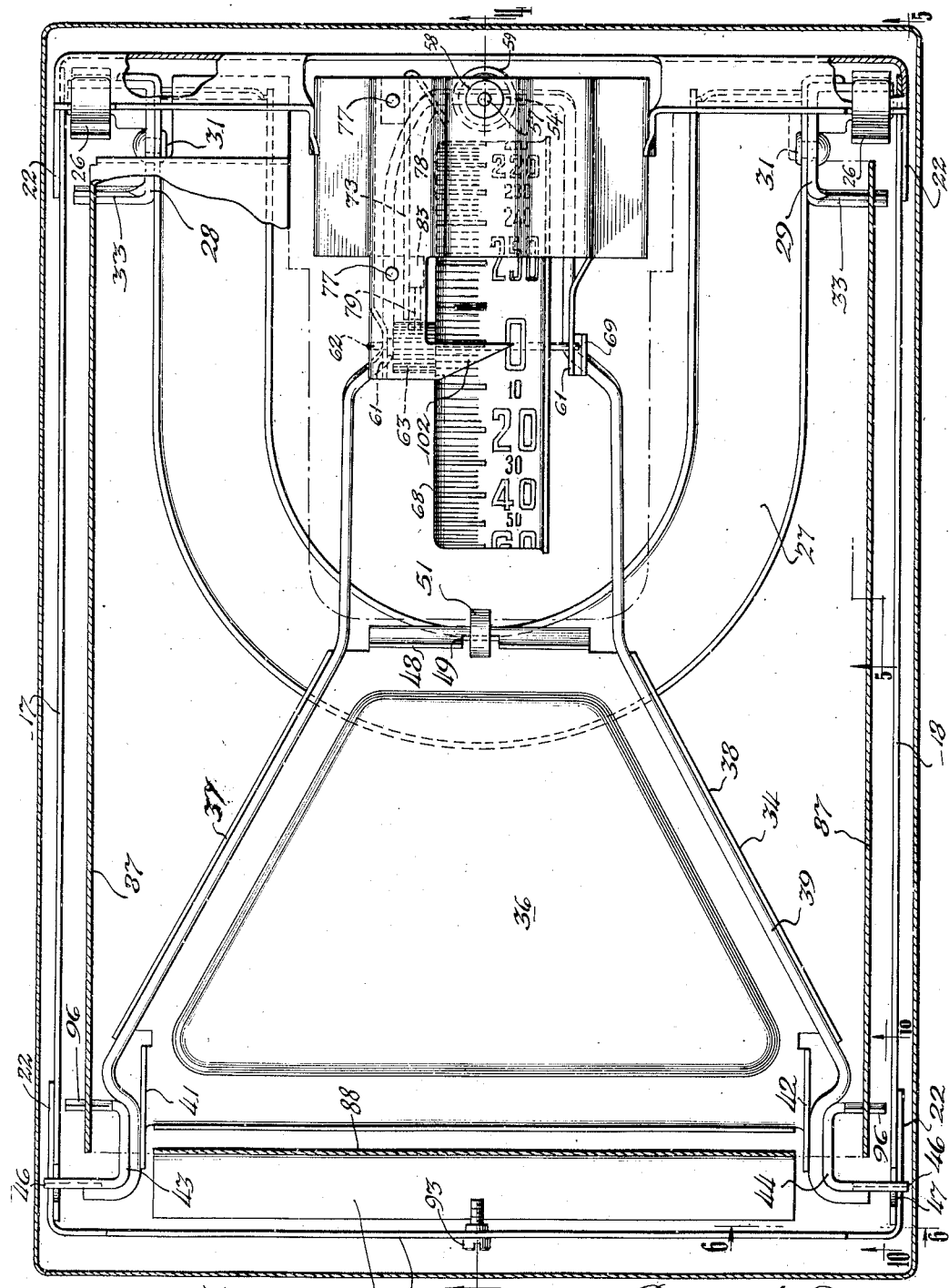
Fig. 3 is a plan view of the scale in which the cover and part of the platform are broken away to more clearly illustrate parts underneath same.
Figure 7:
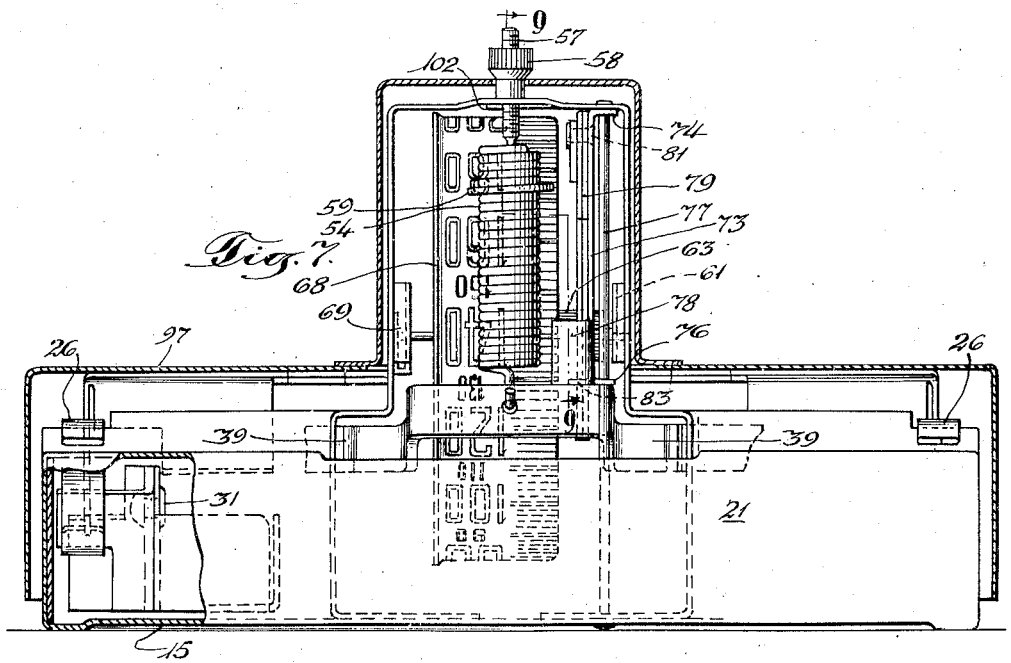
Fig. 7 is an end elevational view of the scale in which the cover and part of the platform are broken away to more clearly illustrate the invention.
Figure 8:
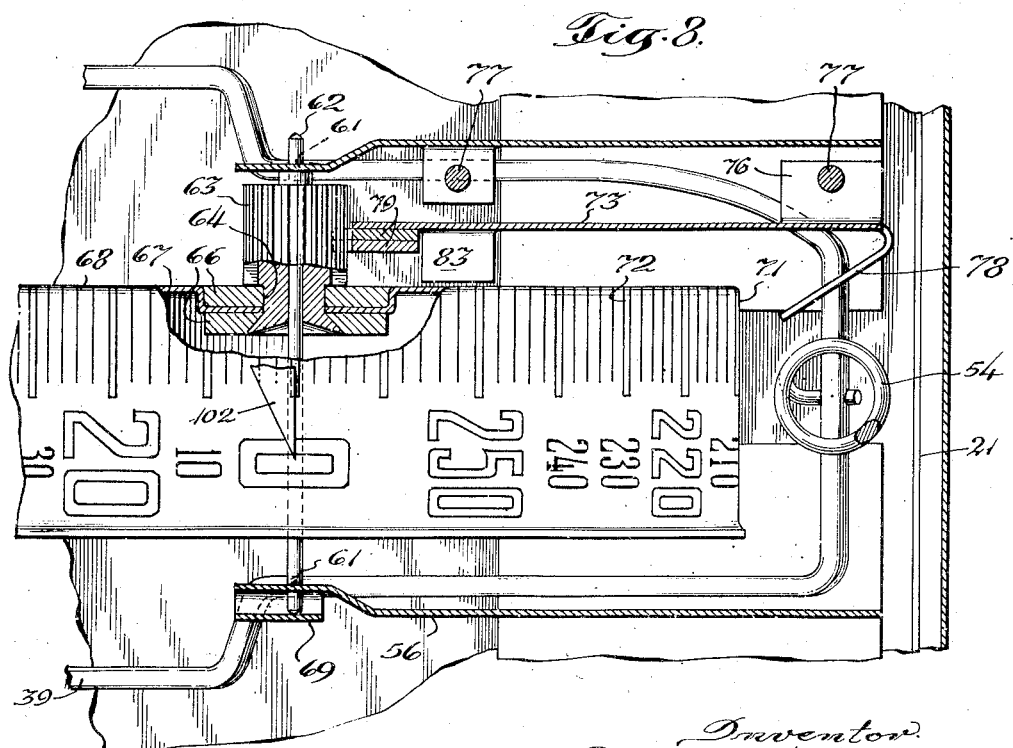
Fig. 8 is a fragmentary sectional view taken along the line 8—8 of Fig. 4.

Referring now to the drawings for a better understanding of this invention, the scale is shown as comprising a base 15 having a bottom 16, side walls 17 and 18, and end walls 19 and 21. Ears 22 are provided on the end walls for welding engagement with the side walls 17 and 18. The end wall 21 is bent inwardly at 23 and then upwardly at 24 for engagement with the upper ends of a pair of S-shaped hangers 26. A lower lever 27, having a U-shape as viewed in plan and being channel shaped in section, has a pair of U-shaped pivot plates 28 and 29 secured thereto by means of rivets 31 and spot welds disposed alongside the rivets. Each pivot plate is formed with a downwardly disposed knife edge 32 and an upwardly disposed knife edge 33. Knife edges 32 engage the lower ends of their respective S-shaped hangers 26 to support the outer ends of the lever 27.

An upper lever 34 comprises a plate 36 having upturned side flanges 37 and 38 for welded engagement with a frame 39. The ends of the frame are welded to upturned flanges 41 and 42, respectively, and to U-shaped pivot plates 43 and 44, respectively. The pivot plates 43 and 44 are formed with downwardly disposed knife edges 46 for engagement in V-shaped recesses 47 formed in the side walls 17 and 18 of the base 15. The plate 36 is provided with an upturned flange 48 having a notch or recess 49 to receive the upper end of a C-shaped link 51, and an aperture 52 is formed in the lower lever 27 to receive the lower end of the link 51. The free end of the upper lever 34 is formed with an aperture 53 to receive one end of a helical spring 54 which has its upper end adjustably positioned on a bracket 56 by means of a screw 57 and a nut 58. A washer 59 is pivotally mounted on the lower end of the screw 57 for engagement between adjacent coils of the spring 54.

The bracket 56 is spot welded to the base 15 and is formed with bearing apertures 61 to receive a dial shaft 62. A pinion 63 is secured to the shaft 62 and has its inner end turned down at 64 to receive a pair of washers 66 which engage the side wall 67 of a dial 68 therebetween. After assembly, the pinion, washers and dial are secured together by peaning the inner end of the pinion and brazing or soldering the parts together. The shaft 62 is held against axial movement in one direction by means of the pinion 63, and in the other direction by means of an ear 69 provided on the bracket 56. The dial 68 is provided with a cylindrical flange 71 upon which suitable graduations or markings 72 are provided as shown.

A rack carrier 73 is provided with an upper flange 74 and a lower flange 76 having bearing aperatures formed therein for sliding engagement with vertically disposed guide rods 77 mounted on the bracket 56. An ear 78 is bent inwardly from the rack carrier for engagement upon the free end of the upper lever 34. As the rack carrier rests by gravity upon the free end of the lever, it rises and falls therewith during movement of the levers. A rack 79 is pivotally connected to the rack carrier at 81 for operating engagement with the pinion 63. The rack 79 is formed with a counter-weight portion 82 which acts to hold the teeth of the rack in proper meshing engagement with the teeth of the pinion 63 during operation. An ear 83 is provided on the rack carrier to prevent disengagement of the rack with the pinion.

A platform 84 is formed with a raised central portion 86, side flanges 87, and end flanges 88 and 89. The end flanges 89 are formed with outwardly turned ears 91 for engagement under the inwardly turned flanges 23. The flange 88 is turned outwardly at 92 for engagement under a screw 93 threaded into the flange 19 of the base 15. V-shaped recesses 94 are formed in the lower edges of the side flanges 87 to receive the upturned knife edges 33 and 96 formed on the U-shaped pivot plates 28, 29, 43 and 44, respectively. A cover plate 97 having a downturned marginal skirt 98 is secured to the platform 84 by means of screws 99 and is provided with a transparent window 101 through which the graduation or markings 72 on the dial 68 may be observed with respect to a pointer 102 formed on the bracket 56.

In the operation of the scale thus described, the weight of a person or object applied to the raised portion 86 acts through the platform and U-shaped pivot plates 28, 29, 43 and 44 to move the free ends of the levers 27 and 34 downwardly against the action of the spring 54, and thus permits the rack carrier 73 to move downwardly by gravity. The rack 79 then acts through the pinion 63 to rotate the dial 68. The weight of a person or object is indicated by the number in registry with the pointer 102. Prior to the use of the scale the dial may be suitably positioned with respect to the pointer 102 by turning the adjustment nut 58 which acts through the spring 54 to raise or lower the free end of the upper lever 34, and thus acts through the rack 79 and pinion 63 to rotate the dial 68.

Referring now to Fig. 3, it will be observed that the upper lever 34 is supported at three points by means of the spring 54 disposed on the longitudinal axis of the lever for engagement with the free end thereof and by means of the pivot plates 43 and 44 disposed equi-distantly on each side of the longitudinal axis of the lever. In order to obtain the greatest registering accuracy on the dial from the arcuate movement of the upper level 34, the ear 78, provided on the rack carrier 73, is disposed for engagement by that portion of the lever having the greatest movement. It will further be observed that the ear 78 is disposed closely adjacent the longitudinal axis of the lever to avoid inaccuracies in dial positioning due to such side inclination of the lever as may result from uneven loading of the platform.

The provision of a rack carrier mounted for free vertical reciprocable movement greatly facilitates assembly and accurate positioning of the several parts of the dial actuating mechanism, and further provides a simplified arrangement for translating the arcuate movement of the lever 34 to linear movement suitable for operating the rack. Having the rack pivotally mounted upon the carrier and maintained in operating engagement with its coacting pinion by gravity also greatly facilitates assembly and insures the accurate positioning of the several parts.

In the manufacture of scales or other devices having working parts, it is, of course, essential that the several parts be held to sufficiently close tolerances to be interchangeable. It is also well known that the degree of accuracy required for accomplishing interchangeability of parts controls the cost thereof. In the present scale construction it will be observed that the several parts have been so designed and arranged as to permit interchangeability of parts without employing restrictive dimensionable tolerances. This greatly decreases the cost of the scale, improves its operation and reliability and also prolongs its useful life.

The U-shaped pivot plates 28, 29, 43 and 44 are inexpensively formed from sheet metal by simple blanking and forming operations. They may be formed of low carbon steel and casehardened, or they may be formed of high carbon steel, if desired. As the two pivot plates at each end of the scale are identical, only two types of plates are required. A particular advantage of these pivot plates lies in the ease with which they may be attached to the levers with the knife edges in exact position by abutting the same against the terminal lugs formed on the ends of the levers. An additional advantage accruing from the particular construction of the U-shaped pivot plates incorporated in this scale will become apparent from an inspection of Fig. 3. As there shown, those arms of the pivot plates 43 and 44, upon which the upwardly disposed knife edges are formed, are somewhat shorter in length than the arms upon which the downwardly disposed knife edges are formed. The shorter arms extend into close proximity to the side walls 17 and 18 of the base 15, and thus prevent lateral displacement of the lever system. The longer arms of these pivot plates engage in the V-shaped recesses 47 formed in the top edges of the side walls 17 and 18 of the base 15 and are of sufficient length so that they extend into close proximity to the downturned marginal side walls 98 of the platform cover 97 and thus prevent lateral shifting of the platform.

It is also desirable to stamp the bearing recesses for the pivot plate knife edges in the side walls of the base and platform in order to reduce the cost of manufacture, simplify assembly, and provide greater compactness. The use of attachable bearings employed with other types of scales usually requires special adjustments and presents various assembly problems not found in the present construction.

Another feature of my invention lies in the provision of a raised center portion on the platform which serves to centralize a person's weight thereon even though the person is standing or leaning too far forward or backward on the scale. The raised portion may be formed directly in the platform as shown or may consist of a separate piece such as a pad of relatively soft material or a piece of metal secured thereto.

It will be observed that a single screw 93 is employed to hold the platform, levers, etc. in assembled relation.

While this invention has been shown in but one form, it is obvious to those skilled in the art that it is not so limited but is susceptible of various changes and modifications without departing from the spirit thereof or the scope of the appended claims.

I claim:

1. In a scale, a base having outer side walls with bearing recesses formed directly in their upper edges, a lever system mounted within said base and having pivot means located in said bearing recesses, and a platform mounted on said lever system, said platform having a depending marginal cover flange disposed outside the base and concealing said bearing recesses and the pivot means therein and dependent side walls inset from said outer walls and having bearing recesses formed therein for engagement with said lever system to support the platform thereon.

2. In a weight scale, the combination of a base having outer side walls with bearing recesses formed in their upper edges, a platform having depending side walls inset from said outer walls and having bearing recesses formed in their lower edges, and a lever interposed between said platform and base, said lever including U-shaped pivot plates having arms of unequal length, said pivot plates each having a downwardly facing knife edge on the longer arm thereof pivotally engaged in one of the recesses of the base and an upwardly facing knife edge on the shorter arms thereof engaged in a recess of the platform, said short arm of each U-shaped pivot plate being engageable with the adjacent side wall of the base to prevent lateral displacement of the lever.

3. In a weight scale as defined in claim 2, said platform having additional depending side walls spaced outside said side walls of the base and said long arm of each of said U-shaped pivot plates being engageable with one of said additional side walls of the platform to prevent lateral displacement of said platform.

MARIUS H. HANSEN.

REFERENCES CITED

The following references are of record in the file of this patent:

UNITED STATES PATENTS

| Number | Name | Date |
|---|---|---|
| 993,005 | Weck | May 23, 1911 |
| 1,248,106 | Hansen | Nov. 27, 1917 |
| 1,880,435 | Haskins | Oct. 4, 1932 |
| 2,141,246 | Jacobus | Dec. 27, 1938 |
| 2,232,830 | Sutton | Feb. 25, 1941 |
| 2,242,949 | Hansen | May 20, 1941 |
| 2,293,572 | Sutton | Aug. 18, 1942 |
| 2,310,560 | Weber | Feb. 9, 1943 |